United States Patent

[11] 3,599,816

[72] Inventor Maurice Moiriat
Montreal, Quebec, Canada
[21] Appl. No. 839,226
[22] Filed July 7, 1969
[45] Patented Aug. 17, 1971
[73] Assignee Gaymor Trailers Limited
St. Hubert, Quebec, Canada

[54] DETACHABLE GOOSENECK TRAILERS
6 Claims, 6 Drawing Figs.
[52] U.S. Cl. .................................................. 214/506,
280/425 R
[51] Int. Cl. .............................................. B60p 1/28
[50] Field of Search .......................................... 280/423 B,
425 A, 43.11, 425 R; 214/505, 506

[56] References Cited
UNITED STATES PATENTS
2,568,283 9/1951 Harpster...................... 214/506
2,590,210 3/1952 Rogers......................... 214/506
2,858,950 11/1958 Martin.......................... 214/505
2,967,720 1/1961 Smith et al.................... 280/425 (A)

Primary Examiner—Albert J. Makay
Attorney—Raymond A. Robic

ABSTRACT: A load carrying bed has its rear end pivotally connected to a bracket arm extending below a rear wheel assembly. The rear wheel assembly is pivotally mounted so that the load carry bed may touch the ground at the rear end, the said bed being free at the front end so that it may lie flat on the ground. A device for raising the rear end and holding it in a raised position is combined with rear wheel assembly.

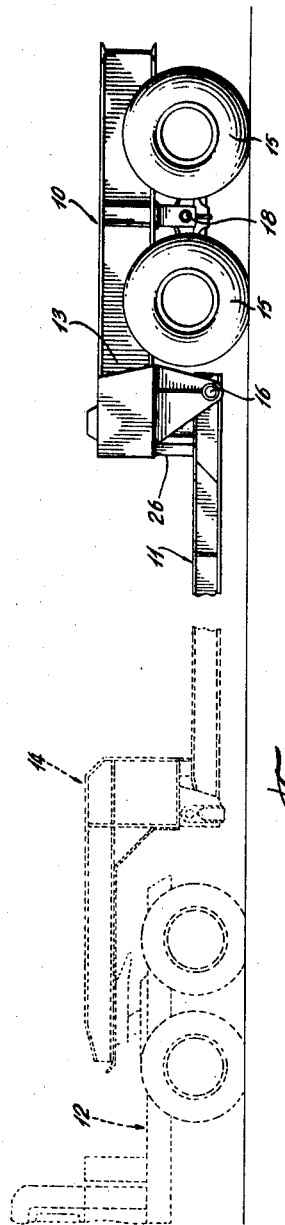
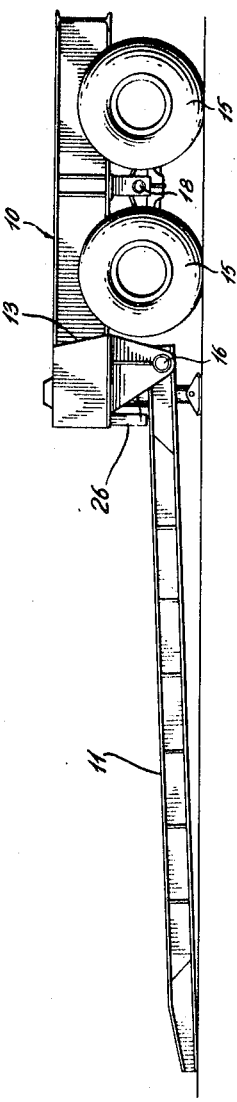

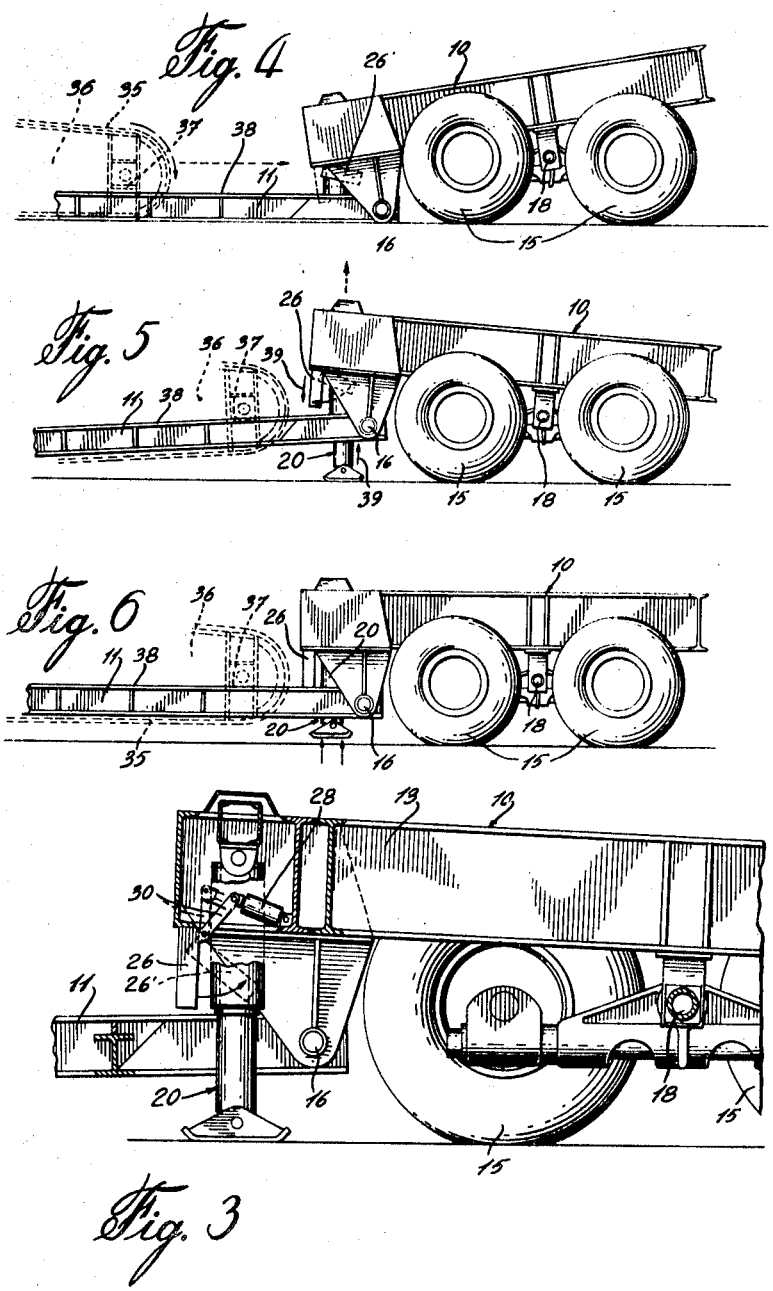

DETACHABLE GOOSENECK TRAILERS

The present invention relates to an improvement in detachable gooseneck trailers and particularly to a novel rear end structure therefor.

The invention is directed to the provision of pressure fluid operated hinge means whereby to allow lowering or raising of the load carrying platform of a detachable gooseneck trailer relatively to the rear end wheel base thereof.

One object of the invention is to provide a new degree of relative freedom in the connection between the rear wheel assembly and the load carrying bed of depressed center detachable gooseneck trailers, whereby to achieve full lengthwise bearing of the load bed on the ground during loading and unloading.

Formerly known detachable gooseneck trailers usually present a narrow load supporting bed the free end of which takes bearing on the ground during loading and unloading; the width of the bed being less than the space between the wheels or crawlers of the equipment to be transported, the said equipment is generally driven lengthwise over said bed and the bed is then raised so as to engage the load between the wheels or crawlers thereof and lift same off the ground. However, in most instances, the bed is sloping with respect to the ground surface and it is then necessary to build ramps alongside the bed to allow sufficient clearance for the load to proceed farther towards the rear.

The present invention proposes to eliminate the inconvenient necessity to build loading ramps by providing an articulated connection between the bed and the rear wheel assembly of the trailer; said articulated connection allowing the bed to be lowered throughout its length so as to lie flatly on the surface of the ground during loading and/or unloading.

The present invention is particularly directed to a combination comprising a rear wheel and suspension assembly, a rear end gooseneck unit, a load bearing platform hingedly connected to the said rear gooseneck unit for relative pivotal motion in a normal longitudinal plane and power means for controlling and locking said pivotal motion during transit.

A preferred embodiment of the invention is hereinafter described, reference being had to the accompanying drawing, wherein:

FIG. 1 is a side view of the rear end portion of a trailer in accordance with the invention, the forward end of same and portion of a tractor vehicle being shown in dotted lines;

FIG. 2 is a side view of same, showing the rear end assembly and load supporting bed; the bed being shown with the detachable gooseneck removed;

FIG. 3 is a longitudinal cross-sectional view of the forward portion of the rear end assembly and dependent portion of the load bed as shown in FIG. 2;

FIGS. 4, 5 and 6 are side views of the same and corresponding to FIG. 2 wherein the bed and rear end assembly are shown in three different stages of relative pivotal displacement.

In FIG. 1 there is shown the combination of a rear end assembly 10, a load carrying bed 11, detachable gooseneck assembly 14 and tractor vehicle 12; the elements of the combination being shown in the relative positions that they would occupy during transit with an articulation between the load bed 11 and the rear end gooseneck 13 blocked by a block element 26.

FIG. 2 illustrates essentially the invention which consists of the combination of the rear end assembly 10 comprising a rear gooseneck frame 13 and sets of wheels 15 suspended thereunder. The frame 13 is pivotally connected through transverse axle 18 to the suspended tandem of wheels 15.

In FIG. 4 it is shown how, when the bed rests flatly on the ground, a load such as a tractor 36 the crawlers 35 of which are schematically shown in dotted, may be driven or positioned thereover without loss of the necessary clearance between the floor 38 of the bed and the underside 37 of the tractor's 36 carriage. During loading and/or unloading, the rear end gooseneck is being forwardly tilted with the block 26 swung out of operative position such as shown in dotted at 26'.

In FIG. 5 it is shown that by extending the lift 20 the forward tilt of the rear end gooseneck may be reversed through pivotal displacement around axle 16; the underside 37 of the load 36 is at the same time engaged by the upper surface 38 of the bed 11; the so engaged portion of said load 35 being lifted off the ground. The blocking device 26 is simultaneously swung into operative position and the lift 20 can thereafter be retracted as shown by arrow 39 causing lowering of the rear end assembly as shown by arrow 39.

In FIG. 6 it is observed that upon retraction of the lifting device 20 the blocking device 26 acts to prevent a return to the configuration shown in FIG. 4 and effectively locks the bed and rear end gooseneck in the relative position which they must occupy during transit. In FIG. 6 it must be assumed that the coupling of the detachable gooseneck 14 to the forward end of the load bed has been resumed; detachable goosenecks are well known in the art, as exemplified by U.S. Pat. No. 2,590,210 and others.

In the sectional view of FIG. 3 it is shown that the blocking device 26 may be positioned or withdrawn mechanically through the action of auxiliary piston 28 on dependent lever arm 30; the blocking means 26 being pivotally secured to the underside of the rear end gooseneck 10.

For unloading, the aforedescribed steps of the loading procedure are merely reversed.

Whether it is for the purpose of loading or for that of unloading, the procedure for lowering the bed is as follows:

a. The detachable gooseneck 14 is released and removed leaving the forward end of the bed 11 to rest on the ground.
b. A lifting force is applied, such as by means of the built-in jack 20, to cause bending of the remaining structure about the hinge pin 16 and thereby release the wedge locking action of the blocking device 26.
c. Removing the blocking device 26 out of its wedge locking position.
d. Retracting the built-in jack 20 and thereby allowing the bed 11 to be lowered and rest fully on the ground while the rear end gooseneck 13 follows by tilting forwardly and pivoting about axle 18 of the wheel base. Loads may now be driven on or away from the load bed as it should rest firmly on the ground and sufficient clearance should exist between the top thereof and the bottom of the load.

I claim:
1. A combination comprising:
a rear wheel assembly having truck wheels and a truck frame pivotally mounted on a horizontal axle on said truck wheels;
a bracket arm extending downwardly at the forward end of said assembly;
a load carrying bed permanently pivotally connected at the rear end thereof to the lower portion of the bracket arm, the said bed having a free forward end and being adapted to lie flat on the ground;
an upright compression means connected to the truck frame adjacent the bracket arms, adapted to expand to touch the ground for lifting the said forward end of the assembly and adapted to contract to enable the rear end of the load carrying bed to touch the ground;
retractable blocking means extending between the truck frame and the carrying bed forwardly of the pivotal connection between the bracket arm and the said bed for preventing the rear wheel assembly from tilting forwardly when the compression means is raised from the ground; and
actuating means on the rear wheel assembly for removing the said blocking means between the truck frame and the carrying bed, whereby a load may be moved onto the bed when the latter is flat on the ground and subsequently raised by the compression means.

2. A combination as recited in claim 1, wherein the compression means consists of a hydraulic cylinder.

3. A combination as recited in claim 1, wherein the actuating means comprise a hydraulic cylinder fixed to the truck frame and lever means mounted between said cylinder and said blocking means.

4. A combination as recited in claim 1, wherein the compression means is pivotally connected to the truck frame.

5. A combination as recited in claim 1, wherein the blocking means comprises power means for articulating the block from the working position to a nonworking position.

6. A combination as recited in claim 1, wherein the blocking means comprises piston means, lever means actuated by the said piston means, the said lever means being connected to the said block for moving the latter from a working to a nonworking position.